US009479467B2

(12) United States Patent
Barlow et al.

(10) Patent No.: US 9,479,467 B2
(45) Date of Patent: *Oct. 25, 2016

(54) GATHERING CONTEXT INFORMATION FOR A COMMUNICATION

(71) Applicant: International Business Machines Corporation, Armonk, NY (US)

(72) Inventors: William C. Barlow, Newburyport, MA (US); Muhammed F. Bulut, Kenmore, NY (US); James E. Christensen, Cortlandt Manor, NY (US); David S. Marshak, Wrentham, MA (US); Andrew L. Schirmer, Andover, MA (US); Amy D. Travis, Arlington, VA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 11 days.

This patent is subject to a terminal disclaimer.

(21) Appl. No.: 13/952,707

(22) Filed: Jul. 29, 2013

(65) Prior Publication Data

US 2013/0346524 A1    Dec. 26, 2013

Related U.S. Application Data

(63) Continuation of application No. 13/532,857, filed on Jun. 26, 2012.

(51) Int. Cl.
   *G06F 15/16*     (2006.01)
   *H04L 12/58*     (2006.01)

(52) U.S. Cl.
   CPC ............... *H04L 51/00* (2013.01); *H04L 51/36* (2013.01)

(58) Field of Classification Search
   CPC ................. H04M 2203/4509; H04M 1/72547
   USPC ................................................. 709/206, 204
   See application file for complete search history.

(56) References Cited

U.S. PATENT DOCUMENTS

| 6,310,944 | B1 * | 10/2001 | Brisebois et al. ........ 379/142.01 |
| 7,472,193 | B2 * | 12/2008 | Dauger ......................... 709/226 |
| 7,623,643 | B2 | 11/2009 | Raghav et al. |
| 8,463,872 | B2 * | 6/2013 | Pounds ................... H04L 51/14 455/466 |
| 8,489,132 | B2 * | 7/2013 | Karmarkar et al. .......... 455/466 |
| 8,565,818 | B1 * | 10/2013 | Bertz et al. .................... 455/557 |

(Continued)

OTHER PUBLICATIONS

"CallXpress Platform Features at a Glance," copyright 2012 AVST, date printed Feb. 8, 2012; <http://www.avst.com/products/callxpress/features_at_a_galnce.asp>.

(Continued)

*Primary Examiner* — Kevin Bates
*Assistant Examiner* — Clarence McCray
(74) *Attorney, Agent, or Firm* — Bill Chan; Erik K. Johnson

(57) ABSTRACT

A computer receives a first information related to a communication sent to a user device of a second person. The computer determines a user device of a first person using the first information. The computer sends a context information request to the user device of the first person. The computer receives a context information reply responsive to the context information request. The computer sends context information of the context information reply to the user device of the second person. The computer releases the communication to the user device of the second person.

6 Claims, 4 Drawing Sheets

(56) References Cited

U.S. PATENT DOCUMENTS

| | | | |
|---|---|---|---|
| 8,763,010 B2* | 6/2014 | Hacigumus | G06F 9/5072 |
| | | | 719/313 |
| 8,924,198 B2* | 12/2014 | Prompt | G06F 17/2881 |
| | | | 704/1 |
| 8,990,302 B2* | 3/2015 | Requena et al. | 709/204 |
| 9,262,612 B2* | 2/2016 | Cheyer | G06F 21/32 |
| 2002/0077086 A1 | 6/2002 | Tuomela et al. | |
| 2004/0213401 A1 | 10/2004 | Aupperle et al. | |
| 2006/0045252 A1 | 3/2006 | Gorti et al. | |
| 2006/0288259 A1* | 12/2006 | Battenfelder et al. | 714/47 |
| 2007/0274291 A1* | 11/2007 | Diomelli | 370/352 |
| 2008/0091931 A1* | 4/2008 | McNutt | G05B 19/054 |
| | | | 713/1 |
| 2010/0138416 A1* | 6/2010 | Bellotti | G06F 17/30056 |
| | | | 707/736 |
| 2010/0159967 A1* | 6/2010 | Pounds | H04L 51/14 |
| | | | 455/466 |
| 2010/0211695 A1 | 8/2010 | Steinmetz et al. | |
| 2010/0211868 A1* | 8/2010 | Karmarkar et al. | 715/234 |
| 2012/0019867 A1* | 1/2012 | Prati | G06F 3/1204 |
| | | | 358/1.15 |
| 2012/0054288 A1* | 3/2012 | Wiese | G06Q 10/10 |
| | | | 709/206 |
| 2012/0210253 A1* | 8/2012 | Luna et al. | 715/753 |
| 2012/0231770 A1* | 9/2012 | Clarke | H04L 12/5885 |
| | | | 455/414.1 |
| 2013/0067538 A1* | 3/2013 | Dharmarajan et al. | 726/4 |
| 2013/0151553 A1* | 6/2013 | Kim | 707/769 |
| 2013/0217364 A1 | 8/2013 | Varoglu et al. | |
| 2013/0218999 A1* | 8/2013 | Martin | 709/206 |
| 2014/0129942 A1* | 5/2014 | Rathod | 715/720 |
| 2014/0380145 A1* | 12/2014 | Wilsher | H04L 12/287 |
| | | | 715/234 |

OTHER PUBLICATIONS

"Method and System to Augment Incoming Caller Information with Previous Conversation", IPCOM000218110D; IP.com Prior Art Database; Disclosed Anonymously, May 21, 2012.

"What is in? MIR3 Mass Notification Solution", Copyright MIR3, Inc.,; Date Printed Jan. 27, 2012; <http://www.mir3.com/intelligent-notification>.

U.S. Appl. No. 13/532,857, entitled "Gathering Context Information for a Communication" filed Jun. 26, 2012.

* cited by examiner

US 9,479,467 B2

GATHERING CONTEXT INFORMATION FOR A COMMUNICATION

CROSS REFERENCE TO RELATED APPLICATION

This application is a continuation of U.S. patent application Ser. No. 13/532,857 filed Jun. 26, 2012 the entire content and disclosure of which is incorporated herein by reference.

FIELD OF THE INVENTION

The present invention relates generally to communication systems, and more particularly to gathering context information about a communication from a user who generated the communication in a communication system.

BACKGROUND

The use of communication channels of many types has increased greatly, given the recent proliferation of communication technologies. Similarly, the use of social, business, and personal networking services has also increased greatly. Communication channels in widespread use include, for example, telephone voice channels, cellular phone text message channels, computerized instant messaging channels, electronic mail channels, and so on. It is often the case that a given person is able to use a given communication channel in multiple ways. For example, a given person may have a business phone number and a cell phone number, or may have multiple email addresses. It is often the case that one person wants to communicate with another immediately or very soon, to give or receive information or to otherwise collaborate in a timely fashion. Channels that enable such communications can be referred to as real-time communication channels. Typically, one person will attempt to contact another using a real time communication channel, and the person being contacted can decide whether to respond. As communication services and technology evolve, the number of alternate communication channels that people use to contact each other grows. Additionally, the number of social, business, and personal networking services also grows. As such, the burden of monitoring and managing all of the possible communication channels and social, business, and personal networking services, with their attendant devices and interfaces, grows ever greater.

Several current solutions attempt to coordinate the many alternate communication channels and the social, business, and personal networking services to alleviate the burden of monitoring and managing the coordinated channels and services. For example, unified communications solutions involve the integration of real-time communication services such as instant messaging, presence information, telephony, and video conferencing with non-real-time communication services such as unified messaging (integrated voicemail, email, text messaging, and fax). Unified communications solutions typically involve multiple products that attempt to provide a unified user interface and user experience. Unified communications solutions can allow a person to send a message on one medium and for it to be received on another medium. For example, a person can receive a voicemail message and choose to access it through e-mail or a cell phone. If the sender of the voicemail message is online, according to the sender's presence information, and available to currently accept calls, the response to the voicemail can be sent immediately through text chat or video call. Alternatively, it may be sent as a non real-time message that can be accessed through a variety of media. Unfortunately, no current solution adequately alleviates the burden of monitoring and managing multiple coordinated channels and services.

SUMMARY

Embodiments of the present invention provide for a program product, system, and method for receiving a first information related to a communication sent to a user device of a second person, determining a user device of a first person using the first information, sending a context information request to the user device of the first person, receiving a context information reply responsive to the context information request, sending context information of the context information reply to the user device of the second person, and releasing the communication to the user device of the second person.

DETAILED DESCRIPTION

Figure 1:
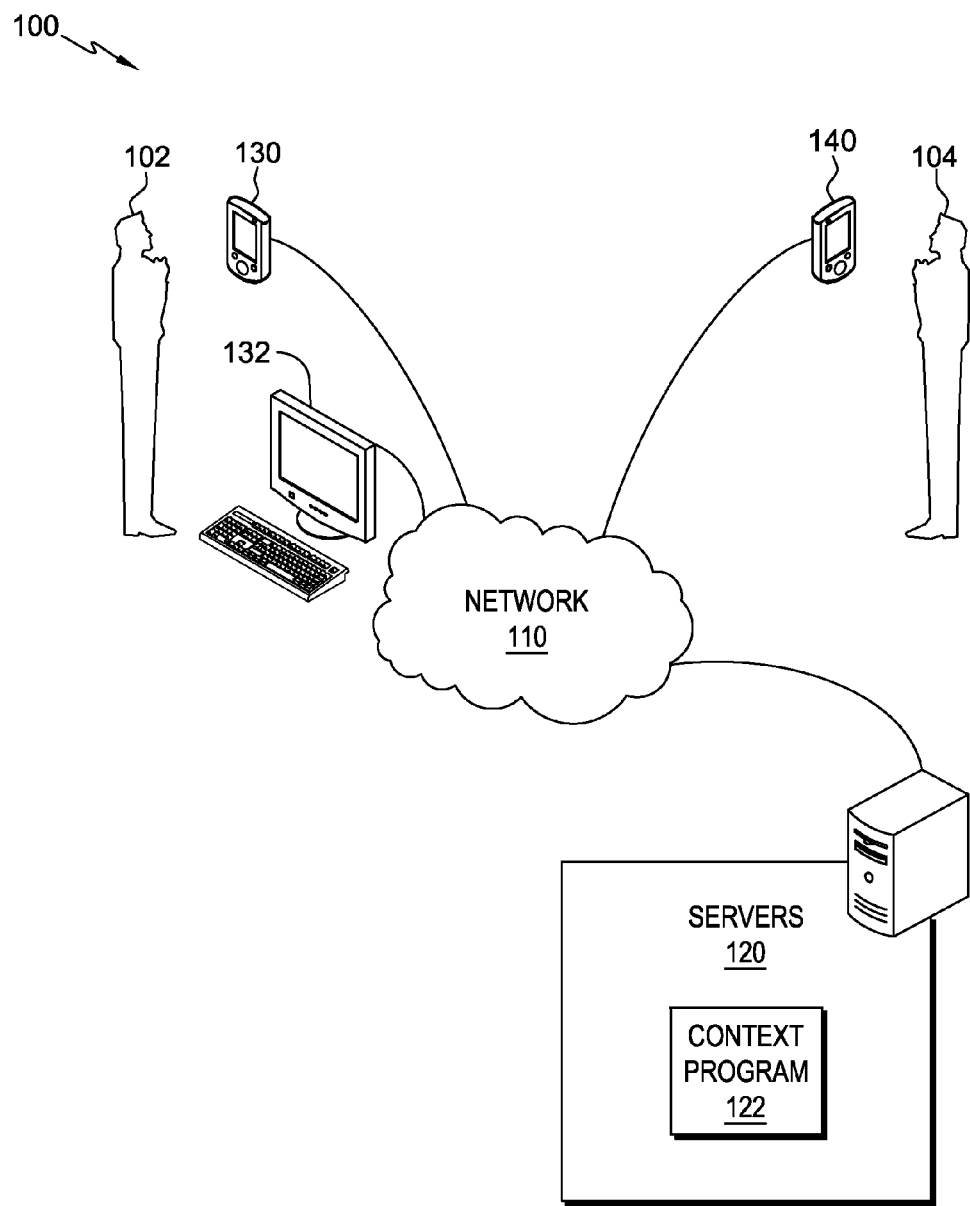
FIG. 1 is a functional block diagram of communications system 100 in accordance with an embodiment of the present invention.

FIG. 1 depicts a functional block diagram of communications system 100 in accordance with an illustrative embodiment of the present invention. Communications system 100 includes network 110, server 120, user device 130, user device 132, and user device 140. Network 110 can be, for example, a local area network (LAN), a wide area network (WAN) such as the Internet, or a combination of the two, and can include wireline or wireless connections. In general, network 110 can be any combination of connections and protocols that will support communications via various channels between server 120, user device 130, user device 132, and user device 140 in accordance with an embodiment of the invention. Persons 102 and 104 can use communications system 100 to communicate with each other via various channels as described below.

In various embodiments, server 120 can include a laptop, tablet, or netbook personal computer (PC), a desktop computer, a personal digital assistant (PDA), a smart phone, a mainframe computer, or a networked server computer. Further, server 120 can represent computing systems utilizing clustered computers and components to act as single pools of seamless resources when accessed through network 110, or can represent one or more cloud computing datacenters. In general, server 120 can be any programmable electronic device as described in further detail with respect to FIG. 4.

User device 130, user device 132, and user device 140 can include in various embodiments a cellular phone, a conference phone, a speaker phone, a desk set, a computer with a resident software phone, or any other type of communication device that can exchange voice signals, exchange and process data, or both. User device 130, user device 132, and user device 140 are each able to transmit and receive voice signals, data signals, or both to and from each other, to and from server 120, or both. In general, user device 130, user device 132, and user device 140 can be any programmable electronic device as described in further detail with respect to FIG. 4.

Server 120 includes context program 122. Context program 122 can operate to intercept a communication from user device 130 of person 102 to user device 140 of person 104, retrieve context information from person 102 via user device 130 or user device 132, and provide person 104 with the context information via user device 140. In one embodiment, the context information is acquired in a consistent manner to give person 104 a predictable context regarding the nature of the communication, which enables person 104 to better decide how and when to respond. In one embodiment, context program 122 does this by giving person 102 a way to furnish certain useful information before person 104 is contacted. Context program 122 acquires this context information regardless of the particular communication device person 102 is using. In one embodiment, if user device 130 lacks an ability to retrieve context information from person 102, then context program 122 can engage person 102 at a second device, such as user device 132, so that by the time person 104 is aware of the communication, person 104 has the information necessary to decide in real time how and when to respond. A communication from person 102 to person 104, as well as a retrieval and provision of context information, are discussed below with reference to FIG. 2.

Figure 2:
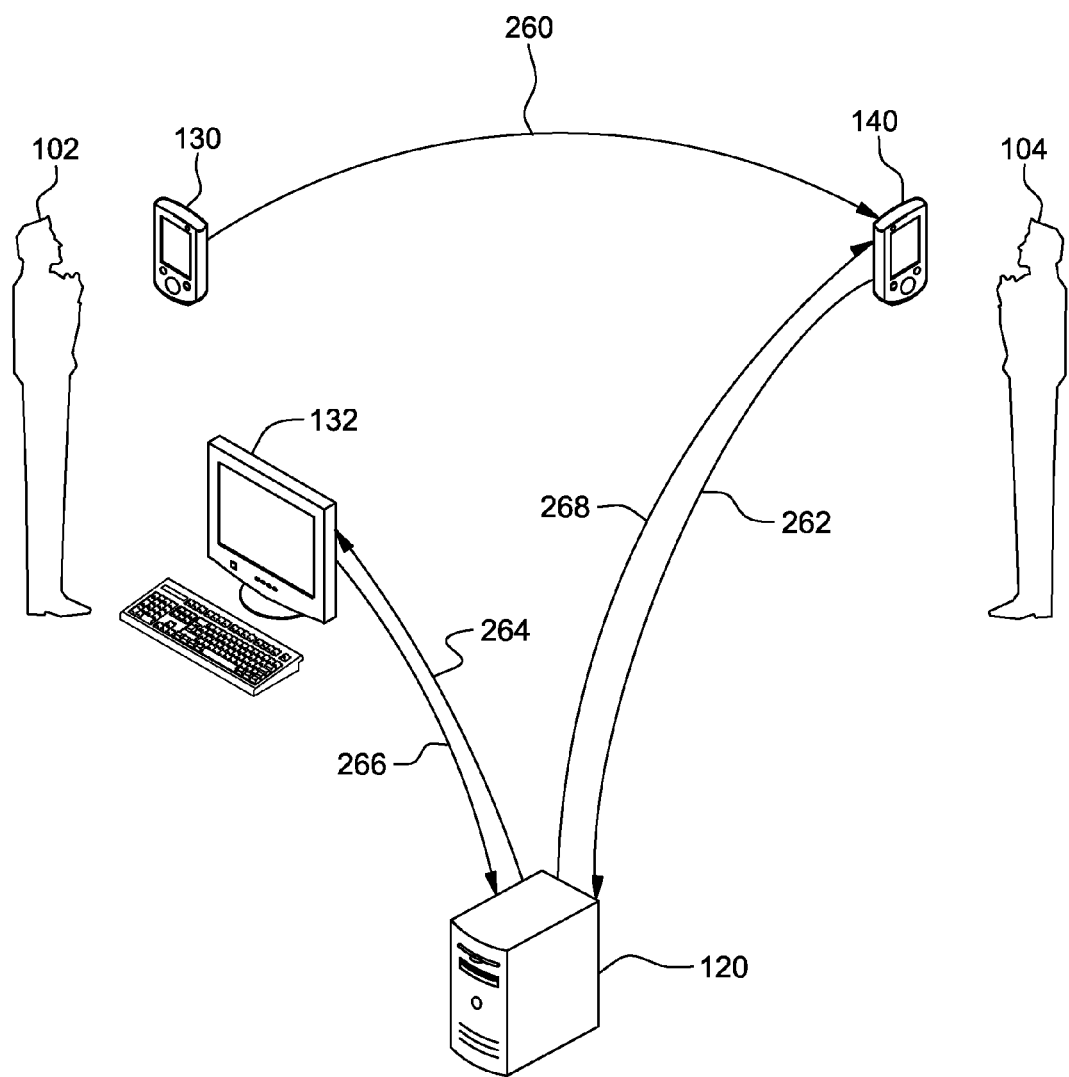
FIG. 2 is a diagram of communications and other messages being made in communications system 100 in accordance with an embodiment of the present invention.

FIG. 2 depicts communication 260 between person 102 and person 104, as well as redirection message 262, context information request 264, context information reply 266, and context information message 268, in accordance with an illustrative embodiment of the present invention. Communication 260 is depicted in FIG. 2 as a message transmitted from user device 130 to user device 140. In one embodiment, communication 260 can be an account message transmitted from user device 130 to user device 140, initiated by person 102 composing an email message on user device 130 and sending the email message to user device 140 via an email server (not pictured). In another embodiment, the account message is a social networking account message, sent via a social networking server (not pictured). In both embodiments, the email server or social networking server can receive the account message and store it in association with an account of person 104, and thereinafter send the account message to user device 140 upon retrieval. In another embodiment, communication 260 is an SMS message transmitted from user device 130 to user device 140, initiated by person 102 sending person 104 an SMS message by composing the SMS message on user device 130 and sending it to user device 140 substantially directly. In yet another embodiment, communication 260 is a phone call transmitted from user device 130 to user device 140, initiated by person 102 dialing a phone number associated with user device 140. In various embodiments communication 260 can be any kind of communication.

As discussed above, user device 130 transmits communication 260. In various embodiments, each distinct account (e.g., an email account, social networking account, or another account used for communication) can be regarded as a channel used by user device 130 for making communication 260. Each distinct phone number (e.g., the phone number of user device 130, user device 140, or another phone number used for communication) can be regarded as a channel used by user device 130 for making communication 260. Further, any distinct mode of communication or distinction made to distinguish a communication endpoint can be regarded as a channel used by user device 130 for making communication 260.

In one embodiment, communication 260 includes full message content. For example, communication 260 can include an entire email message, an entire social networking account message, or an entire SMS message. In another embodiment, communication 260 does not include full message content, and instead includes a notification that full message content is available elsewhere. For example, communication 260 can include a notification that an entire email message, an entire social networking account message, or entire SMS message is available for retrieval on an appropriate server. In an embodiment in which communication 260 is a phone call, communication 260 typically will not include any message content, and instead will include a notification that user device 130 is available to open a voice connection, for example.

In one embodiment, context program 122 of server 120 intercepts communication 260 before person 104 is made aware of communication 260. Thus, although in FIG. 2 communication 260 is depicted as reaching user device 140, it should be understood that communication 260 can be intercepted. Context program 122 can intercept communication 260 in several ways. For example, in one embodiment, person 104 can register user device 140 with server 120, so that communication 260 is redirected from user device 140 to server 120. In another embodiment, person 104 can establish a communication account on server 120 and instruct all callers to send communication 260 directly to server 120. In yet another embodiment, person 102 can register user device 130 with server 120, so that communication 260 is redirected from user device 130 to server 120 without initially being transmitted to user device 140. In one embodiment, communication 260 is intercepted and redirected from user device 140 via redirection message 262, which transfers communication 260, or salient information about communication 260, to context program 122 of server 120.

After intercepting communication 260 and receiving redirection message 262, context program 122 transmits context information request 264 to person 102 via either user device 130, or a second device, such as user device 132, as depicted in FIG. 2. Context program 122 will select either user device 132 or user device 130 depending on which one has a suitable interface with which to retrieve context information from person 102. Having received redirection message 262, context program 122 determines that communication 260 was sent directly from user device 130, and also determines that person 102 is additionally reachable via user device 132 by referral to, for example, a table listing all user devices usable to reach a given person. If user device 130 and user device 132 both have a suitable interface, then in one embodiment context program 122 chooses user device 130 from which communication 260 originated, because it is more likely that person 102 will already be paying attention to user device 130. Upon receiving context information request 264, the receiving user device, for example user device 132, surfaces an interface suitable for gathering context information from person 102. To surface an interface, a user device presents the interface to a person using a suitable medium, or prompts the person to respond to the interface. In one embodiment, user device 132 may not be equipped to surface a visual interface, but may be equipped for surfacing an audio interface. Alternately, user device 132 may be equipped to surface a visual interface, but may not be equipped for surfacing an audio interface.

Having received context information request 264, in one embodiment user device 132 surfaces a visual interface with labels or text prompts instructing person 102 to enter context information, including one or more of the subject of communication 260, a description of communication 260, the urgency of communication 260, a deadline of contact for communication 260, and other context information. In one embodiment, user device 132 can surface a voice or video interface with voice prompts or video prompts instructing person 102 to enter context information including one or more of the items described above.

After gathering the context information utilizing the surfaced interface, user device 132 transmits the context information in context information reply 266 to context program 122 of server 120. If the context information is inadequate by virtue of missing requested information, then in one embodiment context program 122 can resend context information request 264 and require the missing context information before sending context information message 268 to user device 140. For example, the name of person 102, or other mandatory information, if omitted, might be required. Further, if the context information is inadequate by virtue of needing additional information context program 122 can resend context information request 264 and require additional context information before sending context information message 268 to user device 140. For example, if half of a set of optional information questions are unanswered, a new set of questions might be required to be answered. The required additional context information can be new or different information not requested in the original request, while the required missing context information can be information that was requested in the original request. In one embodiment, user device 132 can send the context information directly to user device 140.

After receiving context information reply 266, context program 122 transmits the context information in context information message 268 to user device 140. If certain context information has been omitted by person 102, then in one embodiment person 104 instructs context program 122 to resend context information request 264 and require the missing context information.

When user device 140 receives context information message 268, person 104 has a consistent and predictable way to assess communication 260, either as an isolated communication or in comparison to other communications, and thus has an ability to determine how and when to respond. For example, if communication 260 is from a stranger, it will often be ignored by person 104, but if person 104 receives communication 260 in combination with context information message 268, the additional context information in context information message 268 about subject, urgency, or other topics helps distinguish communication 260 in a way that may spur person 104 to give communication 260 attention sooner, if not immediately. For another example, if communication 260 is from a colleague of person 104 it may be answered immediately out of courtesy, when it is the case that an immediate response is not necessary or requested by person 102, but if person 104 receives communication 260 in combination with context information message 268, person 102 might realize that answering communication 260 is not necessary or requested.

In various embodiments, context information message 268 can be presented to person 104 in several ways, depending on the channel and device types of user device 140, user device 130, and user device 132. In one embodiment, for example, although communication 260 is a phone call and context information was gathered by surfacing an audio interface on user device 130, context information message 268 can be presented on user device 140 as text or video, via a speech-to-text component of server 120. In another embodiment, in which communication 260 is an SMS message and context information was gathered by surfacing a text interface on user device 132, context information message 268 can be presented on user device 140 as audio, via a text-to-speech component of server 120. In yet another embodiment, context information message 268 can be presented on user device 140 in a form substantially similar to the form in which it was gathered on user device 130 or user device 132.

In various embodiments, context information message 268 can be analyzed and additionally interpreted for the caller, to contextualize the degree of urgency. For example, if context information message 268 indicates that communication 260 is urgent, context program 122 can contextualize the urgency by correlating context information message 268 with a fact, supplied by person 104, that person 102 is typically excitable or tends to exaggerate the degree of urgency of his or her messages. In another embodiment, context program 122 or user device 140 can accumulate context information message 268 along with additional context information messages, to compile profiles of callers, for example. Further, unanswered communication, including communication 260, can be gathered into a list within context program 122 or on user device 140, allowing person 104 or an agent of person 104 to compare communications for the purpose of processing them most efficiently. Further still, communication histories can be used to document and recall responses and analyzed to provide deeper knowledge about response patterns and behaviors.

Figure 3:
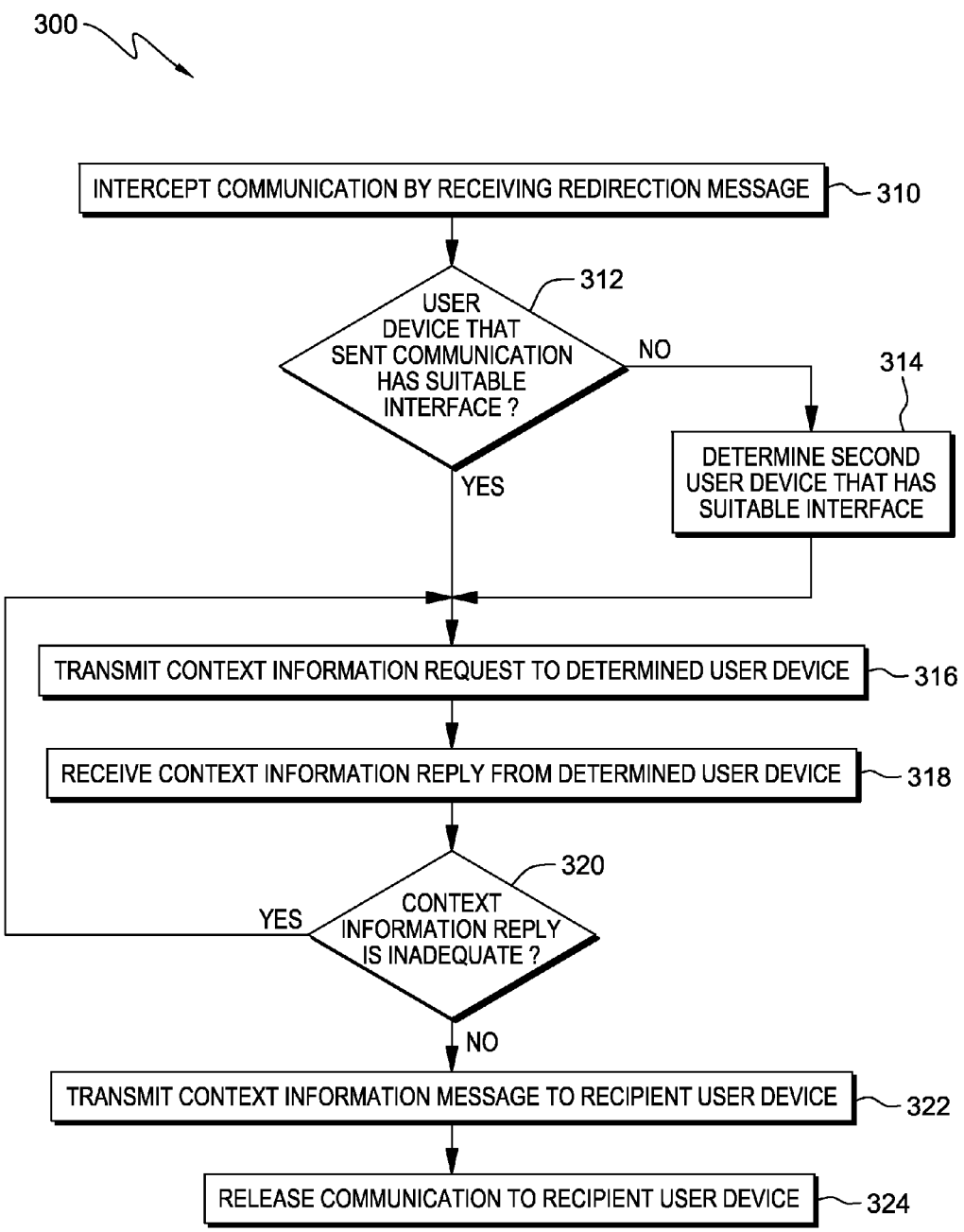
FIG. 3 is a flowchart depicting the steps followed by server 120 in accordance with an embodiment of the present invention.

FIG. 3 includes flowchart 300 depicting the steps followed by server 120 in accordance with an embodiment of the present invention. In step 310, context program 122 of server 120 intercepts a communication by receiving a redirection message. For example, in one embodiment context program 122 can intercept communication 260 by receiving redirection message 262 from user device 140. In another embodiment, context program 122 can intercept communication 260 by receiving redirection message 262 directly from user device 130. In step 312, context program 122 determines if the user device that sent the communication has a suitable interface. For example, context program 122 can determine if user device 130 has a suitable interface for surfacing a particular kind of interface. If context program 122 determines that the sending user device has a suitable interface, flowchart 300 proceeds to step 316. If context program 122 determines that the sending user device does not have a suitable interface, flowchart 300 proceeds to step 314, in which context program 122 determines a second user device that does have a suitable interface. For example, context program 122 could determine that user device 132 has a suitable interface for surfacing a particular kind of interface. In step 316, for surfacing a particular kind of interface transmits a context information request to the determined user device. For example, context program 122 can send context information request 264 to user device 132. Upon receiving context information request 264, user device 132 surfaces an interface suitable for gathering context information from person 102. For example, user device 132 may surface a visual interface, an audio interface, or any other kind of user interface.

In step 318, context program 122 receives a context information reply from the determined user device. For example, in one embodiment context program 122 receives context information reply 266 from user device 132, after user device 132 interacts with person 102 using a surfaced interface to gather context information. In step 320, context program 122 determines whether the context information reply is inadequate. For example, context program 122 can determine whether context information reply 266 is inadequate. If the context information reply is inadequate, then flowchart 300 proceeds back to step 316, in which context program 122 attempts to gain missing or additional context information from person 102. If the context information reply is adequate, then flowchart 300 proceeds to step 322. In step 322, context program 122 transmits a context information message to the recipient user device. For example, context program 122 can transmit context information message 268 to user device 140. Person 104 can view and consider the gathered context information within context information message 268 utilizing user device 140, to decide whether and how to respond to or acknowledge communication 260. If person 104 desires to respond to or acknowledge communication 260, then in step 324 the communication is released to the recipient user device. For example, in one embodiment, in which communication 260 was intercepted directly at server 120, context program 122 can release communication 260 to user device 140. In another embodiment in which communication 260 was intercepted at user device 140 and redirected to server 120, communication 260 is released upon user device 140 without the direct involvement of context program 122.

Figure 4:
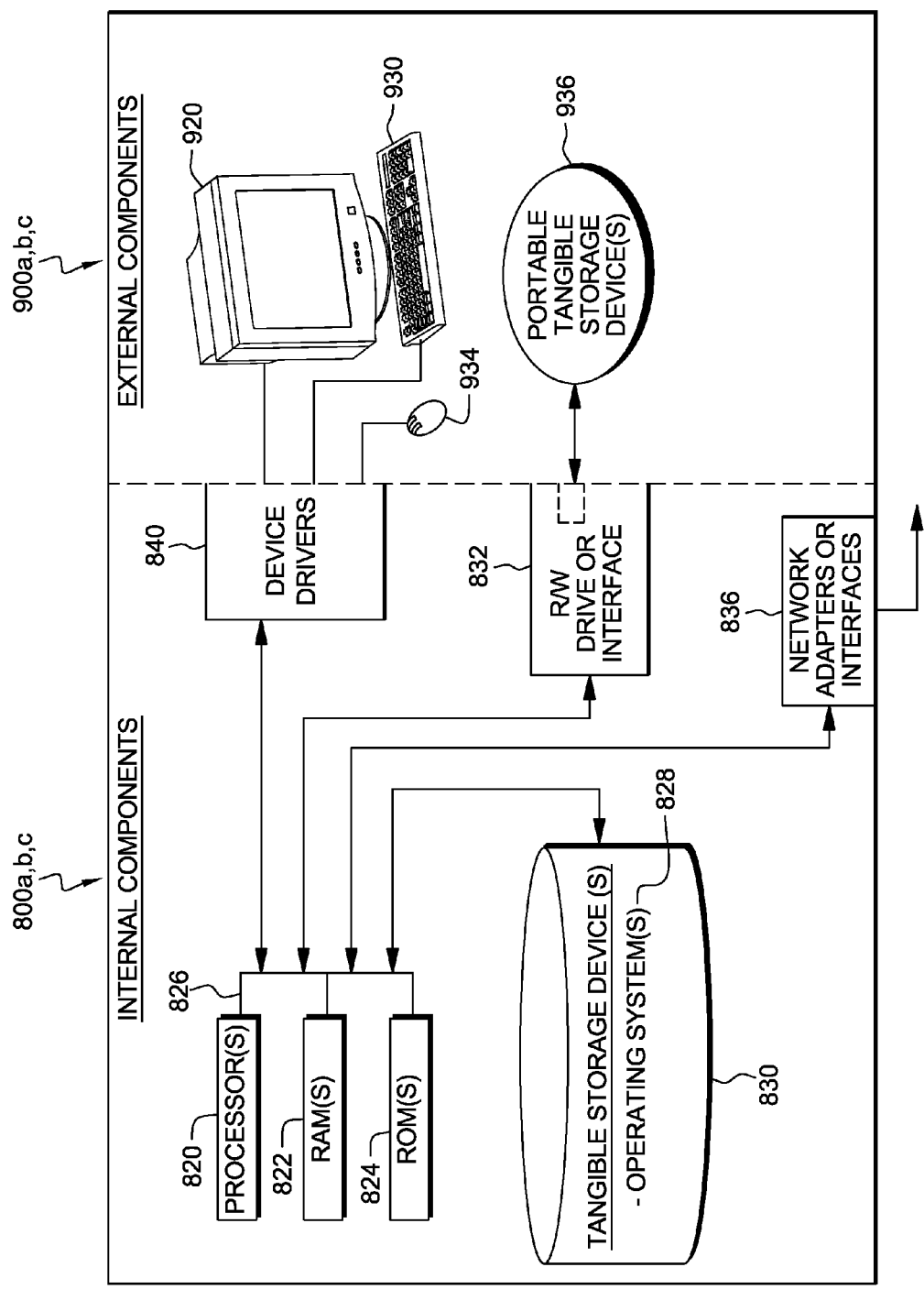
FIG. 4 is a block diagram of hardware and software within communications system 100 in accordance with an embodiment of the present invention.

FIG. 4 shows a block diagram of the components of a data processing system 800, 900, such as server 120, user device 130, user device 132, or user device 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, a PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Server 120, user device 130, user device 132, or user device 140 include respective sets of internal components 800a, b, c and external components 900a, b, c illustrated in FIG. 4. Each of the sets of internal components 800a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and context program 122 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. Context program 122 can be stored on one or more of the respective portable computer-readable tangible storage devices 936, read via the respective R/W drive or interface 832 and loaded into the respective storage device 830.

Each set of internal components 800a, b, c also includes network adapters or interfaces 836 such as a TCP/IP adapter cards, wireless wi-fi interface cards, or 3G or 4G wireless interface cards or other wired or wireless communication links. Context program 122 can be downloaded to server 120 from an external computer via a network (for example, the Internet, a local area network or other, wide area network) and respective network adapters or interfaces 836. From the network adapters or interfaces 836, context program 122 is loaded into the respective storage device 830. The network may comprise copper wires, optical fibers, wireless transmission, routers, firewalls, switches, gateway computers and/or edge servers.

Each of the sets of external components 900a, b, c can include a computer display monitor 920, a keyboard 930, and a computer mouse 934. External components 900a, b, c can also include touch screens, virtual keyboards, touch pads, pointing devices, and other human interface devices. Each of the sets of internal components 800a, b, c also includes device drivers 840 to interface to computer display monitor 920, keyboard 930 and computer mouse 934. The device drivers 840, R/W drive or interface 832 and network adapters or interfaces 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation. The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A computer-implemented method comprising the steps of:
   intercepting a first information related to a communication sent to a user device of a second person by a user device of a first person;
   determining whether the user device of the first person is a suitable device using the first information, wherein determining whether the user device of the first person is a suitable device further comprises determining that the user device of the first person has a suitable interface for gathering context information from the first person based on an interface required by a context information request;
   based on determining that the user device of the first person is not a suitable device for gathering context information from the first person based on requirements of the context information request, determining another user device of the first person that is suitable for gathering context information from the first person based on the requirements of the context information request;
   redirecting the context information request to the other user device of the first person;
   receiving a context information reply responsive to the context information request; and
   sending context information of the context information reply to the user device of the second person, wherein the sent context information comprises of an urgency of the communication, and a deadline of contact for the communication.

2. The method of claim 1, further comprising the step of:
   releasing the communication to the user device of the second person.

3. The method of claim 1, wherein the communication was sent from the user device of the first person.

4. The method of claim 1, wherein the suitable interface includes a text interface, an audio interface, or a video interface.

5. The method of claim 1, further comprising the step of:
   determining whether the context information of the context information reply is inadequate.

6. The method of claim 1, further comprising the step of:
   responsive to the determining that the context information of the context information reply is inadequate, sending another context information request to the user device of the first person in order to gather additional context information.

* * * * *